United States Patent Office 3,652,543
Patented Mar. 28, 1972

3,652,543
PROCESS FOR THE PRODUCTION OF
1,2,4,5-TETRAHYDRO-3-AZEPINES
Karl Hoegerle, Basel, Switzerland, assignor to Geigy
Chemical Corporation, Ardsley, N.Y.
No Drawing. Filed Feb. 15, 1968, Ser. No. 705,612
Claims priority, application Switzerland, Feb. 17, 1967,
2,386/67
Int. Cl. C07d 41/08
U.S. Cl. 260—239 BB
3 Claims

ABSTRACT OF THE DISCLOSURE

Process for the production of 1,2,4,5-tetrahydro-3-azepines from styrene via N-aziridinyl-alkyl-benzenes, and halogeno-alkylamino-alkyl-benzenes, which latter intermediates are useful as herbicides; from the latter, the corresponding 1,2,4,5-tetrahydro-3-azepines are obtained in a simple, industrially applicable process and in very satisfactory yields. 1,2,4,5-tetrahydroazepines are useful as intermediates in the production of antihypertensive agents, hypoglycemic agents and some possess themselves anorexogenic properties.

In a first aspect, the present invention concerns a new process for the production of 1,2,4,5-tetrahydro-3-benzazepines.

In a second aspect, the invention relates to new phenethylammonium salts as well as compositions containing these novel salts as herbicidally active ingredients, and to a method of controlling weeds and other undesirable plant growth with the aid of these novel salts.

Up to the present, no economically workable process for the production of 1,2,4,5-tetrahydro-3-benzazepines which, in the azepine ring, have no substituents or, e.g. have hydrocarbon radicals as C-substituents, has been disclosed. It is true that unsubstituted 1,2,4,5-tetrahydro-3-benzazepine is obtained in good purity by high pressure hydrogenation of 1,2-phenyldiacetonitrile in ammonia with a nickel catalyst [P. Ruggli et al., Helv. Chim. Acta. 18, 1394 (1935) and 20, 925–927 (1937)] but bad yields are obtained. The application of this process to 1,2,4,5-tetrahydro-3-benzazepines having hydrocarbon radicals as C-substituents in the azepine ring has not been disclosed and would be uneconomical. In addition, the starting materials needed therefor would be very difficultly accessible. However, as such tetrahydro-3-benzazepines have become of considerable importance in the last few years, it became necessary to develop a simple and economically workable process for the production of these and similar compounds. (1,2,4,5-tetrahydro-3-benzazepines are also referred to in the literature as 2,3,4,5-tetrahydro-1H-3-benzazepines.)

According to the process of the invention, 1,2,4,5-tetrahydro-3-azepines are produced as follows.

FIRST STAGE

A compound of the formula

(I)

wherein:
A represents the bridging members of an unsubstituted or substituted carbocyclic aromatic ring system, and
B represents an alkenyl radical having preferably not more than two or three straight-chain carbon atoms, the double bond of which radical is conjugated with the —C=CH bond in Formula I, is reacted with a cyclic amine of the formula

(Ia)

wherein $B_2$ represents an ethylene bridging member which can have substituents which are inert under the reaction conditions of this and the subsequent process stages, in the presence of an alkali metal, preferably sodium metal. There is obtained a compound of the formula

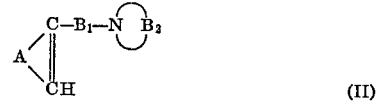
(II)

wherein:
A and $B_2$ have the meanings given above, and
$B_1$ represents an ethylene bridging member any substituents of which must be inert under the reaction conditions of the subsequent process steps.

SECOND STAGE

The intermediate of Formula II obtained from the first stage of the process according to the invention is then reacted with hydrogen halide in the presence of a solvent and an intermediate product of the formula

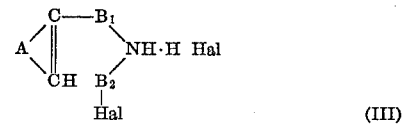
(III)

wherein A, $B_1$ and $B_2$ have the same meanings as given hereinbefore, and Hal represents a halogen atom of an atomic number of at least 17, is obtained.

Hydrogen chloride and hydrogen bromide are the most suitable hydrogen halides for this second stage of the process according to the invention, but also hydrogen iodide can be used. As solvents, in particular alkanols and water as well as alkanol and water mixtures can be used. The lower alkanols such as methanol, ethanol, n-propanol, isopropanol etc. are the preferred alkanols. In the process according ot the invention, the hydrogen halide is used preferably in the form of an alkanolic solution; methanol and ethanol are particularly suitable. In general, the temperatures for the reaction with the hydrogen halide are between −10 to 30° C., preferably 10–20° C.

Other suitable solvents are, e.g. acetone, methylethyl ketone, acetone/ethanol, methanol/diethyl ether, ethanol/diethyl ether or diethyl ether.

Preferably, organic solvents in which the salt of Formula III has a low solubility are chosen so that the salt can be isolated by filtration.

THIRD STAGE

The intermediate of Formula III is then reacted with a Lewis acid at temperatures between 100 and 300° C., and the resulting end product formed of the formula

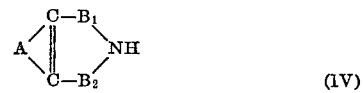
(IV)

wherein A, $B_1$ and $B_2$ have the above-given meanings, is then recovered in a conventional manner from the reaction mixture.

The following Lewis acids can be used in the third stage of the process according to the invention: aluminum chloride, antimony pentachloride, iron-III chloride, tellurium chloride, tin chloride, titanium tetrachloride, bismuth chloride, zinc chloride as well as the corresponding bromides and iodides, also borotrifluoride or borotrichloride; other suitable Lewis acids are: sulphuric acid, phosphorus pentoxide or polyphosphoric acids. The Lewis acid is generally added to the reaction mixture in an amount of 0.05 to 5 mol, preferably 1 to 1.5 mol per mol of compound of Formula III. The reaction temperatures with the Lewis acid lies between 100 and 300° C., preferably between 150 and 250° C. The tetrahydro-3-azepines are isolated pouring the reaction mixture onto ice and then adding preferably an inorganic base, e.g. an alkali hydroxide such as sodium hydroxide, potassium hydroxide, or an alkaline earth oxide.

In general, the reaction of the intermediate products of Formula III with a Lewis acid does not require a solvent or diluent, if desired however, nitrobenzene, dioxane, etc. for example can be used as solvents.

In Formulas I to IV the grouping

represents more in particular a mono- or poly-nuclear, carbocyclic aromatic ring system such as the phenylene, naphthylene or tetrahydronaphthylene radical. These ring systems can be substituted or unsubstituted. Examples of substituents are non-ionogenic substituents such as alkyl, alkenyl, dialkylamino, acylamino, halogenoalkyl, acyl, halogen, etc., or ionogenic radicals such as hydroxy, mercapto, amino, alkylamino carboxyl. Several identical or different substituents can be present. The ethylene bridging members $B_1$ and $B_2$ can have ionogenic and/or non-ionogenic substituents, preferably however, unsubstituted or substituted hydrocarbon radicals such as alkyl, alkenyl, cycloalkyl, cycloalkenyl or phenyl radicals, halogen up to the atomic number 35, nitro groups, etc. In addition they can form part of a 5- to 8-membered cycloaliphatic or heterocyclic ring system.

In a preferred mode of carrying out the process according to the invention in practice, tetrahydro-3-benzazepines of the more restricted formula

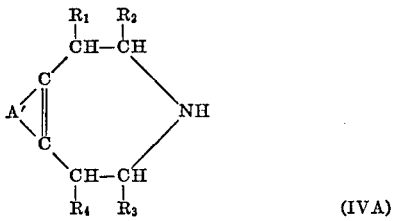

wherein A' represents the bridging members of an unsubstituted or substituted phenylene radical, and more preferably the grouping

represents

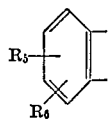

wherein each of $R_5$ and $R_6$ independently represents hydrogen, halogen having an atomic number of at most 35, an alkyl radical having 1 to 4 carbon atoms or the trifluoromethyl radical, and $R_1$, $R_2$, $R_3$ and $R_4$ independently of each other represent hydrogen, a halogen atom up to the atomic number 35, an alkyl, alkenyl, cycloalkyl or cycloalkenyl radical, an unsubstituted or substituted phenyl radical; more preferably, however, hydrogen, alkyl of from 1 to 6 carbon atoms, or a phenyl radical any substituent of which is selected from halogen of an atomic number of at most 35 and lower alkyl, or at most two of these substituents represent cycloalkyl of from 3 to 7 carbon atoms; and the pairs of symbols $R_1$ and $R_2$ on the one hand and $R_3$ and $R_4$ on the other, can each also represent a polymethylene bridging member, especially, however, $R_3$ and $R_4$ when taken together, represent a trimethylene or tetramethylene bridge; are produced by reacting an aziridine derivative of the formula

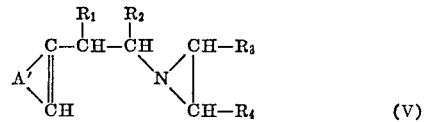

wherein A', $R_1$ $R_2$, $R_3$ and $R_4$ have the meanings given in Formula IVA, with a hydrogen halide in an alkanol, and heating the phenylethylammonium halide obtained of the formula

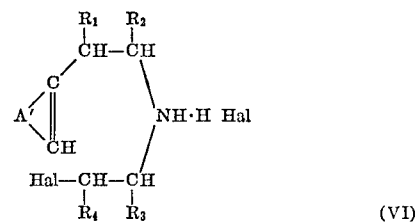

wherein A', $R_1$, $R_2$, $R_3$ and $R_4$ have the meanings given in Formula IVA and Hal represents a halogen atom, with a Lewis acid, preferably with aluminum chloride and, then, to isolate the free benzazepine of Formula IVA, adding a strong inorganic base, e.g. an alkali metal hydroxide to the reaction product.

The phenylene radical formed by

can be mono- or poly-substituted, e.g. by halogen, alkyl, alkylamino, dialkylamino, acylamino, halogeno-alkyl, alkoxycarbonyl, alkoxyalkyl, acyl, hydroxy, mercapto, amino, etc. Several substituents can be identical or different. If one or more of the symbols $R_1$, $R_2$, $R_3$ and $R_4$ represents halogen then, by this, preferably fluorine and chlorine are to be understood. By low alkyl radicals are meant those having 1 to 6 carbon atoms such as methyl, ethyl, the propyl, butyl, pentyl and hexyl radicals; by cycloalkyl or cycloalkenyl radicals are meant, e.g. the cyclopropyl, cyclohexyl, or cycloheptyl radical, the cyclopentenyl, cyclohexenyl or cycloheptenyl radicals. A phenyl radical symbolised by one or more of the symbols $R_1$, $R_2$, $R_3$ and $R_4$ can contain the substituents mentioned above. Preferably the trimethylene, tetramethlene and pentamethylene group are meant by a polymethylene bridge which can be formed by the pairs of symbols $R_1$, $R_2$ and $R_3$, $R_4$.

The process according to the invention enables tetrahydro-3-benzazepine to be produced in good yield and high purity in a simple and economical way. It has a particular advantage in that the starting materials necessary therefor are easily accessible. Some of the 1,2,4,5-tetrahydro-3-benzazepines which can be produced according to the invention are known (P. Ruggli et al., loc. cit). The known and, particularly, the new compounds of Formula IV are of great importance as intermediate products for pharmaceuticals. Among such pharmaceuticals are, for instance, antihypertensive agents described in U.S. patent 3,093,632, and hypoglycemic agents [cf. U.S. patent application Ser. No. 667,363 filed Sept. 13, 1967 (South African patent application 67/5527 published Mar. 14, 1968)]. Some of the compounds of Formula IV also have biocidal properties so that they can also be used in pest control, and some possess anorexogenic properties.

The starting materials of Formula II can be obtained according to German Pat. No. 830,048, or according to British Pat. No. 692,368, or according to Herbert Bestian, Ann. 566, pp. 238–239, by adding $\alpha,\beta$-alkylene imines to styrenes in the presence of alkali metal.

In a second aspect, the invention provides new phenethylamonium salts of the formula

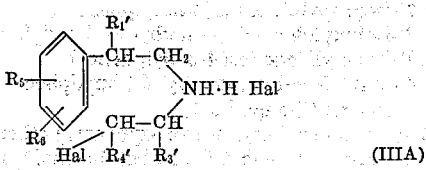

wherein each of $R_1'$, $R_3'$ and $R_4'$, independently, represents hydrogen, an alkyl radical with 1 to 6, but preferably 1 to 4 carbon atoms, or a phenyl radical any substituent of which is selected from halogen having an atomic number of at most 35 and alkyl of from 1 to 4 carbon atoms, and at most two of the symbols $R_1'$, $R_3'$ and $R_4'$ represents 3- to 7-membered cycloalkyl, or $R_3'$ and $R_4'$ together represent the trimethylene or tetramethylene group, each of $R_5$ and $R_6$ have the same meanings as in Formula IVA, and Hal represents chlorine or bromine, with the proviso that at least one of the symbols $R_1'$ to $R_6$ is a substituent other than hydrogen.

While the new phenethylammonium salts of Formula IIIA are useful as intermediate products for pharmaceuticals as mentioned hereinbefore, those wherein each of $R_1'$, $R_3'$ and $R_4'$ independently represents hydrogen or the methyl radical, and each of $R_5$ and $R_6$ independently represents hydrogen, halogen having an atomic number of at most 35 or an alkyl radical of from 1 to 4 carbon atoms also possess herbicidal activity.

As alkyl radicals $R_1'$ to $R_6$ in Formula IIIA are meant straight or mono- or polybranched alkyl radicals, such as the methyl, ethyl, n-propyl, isopropyl, n-butyl, isobutyl, sec. butyl or tert. butyl radical as well as the various pentyl and hexyl radicals. When $R_1'$, $R_3'$ and $R_4'$ represent 3- to 7-membered cycloalkyl, they are e.g. the cyclopropyl, cyclobutyl, cyclopentyl, cyclohexyl and cycloheptyl radical. As halogen having an atomic number of at most 35, in particular chlorine and bromine are meant.

The new phenylethylammonium salts of Formula IIIA are produced by reacting an aziridine derivative of the formula

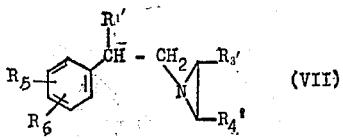

wherein $R_1'$ to $R_6$ have the meanings given above, with a hydrogen halide in the presence of a solvent as described in the second stage of the process according to the first aspect of the invention.

The following non-limitative examples illustrate the invention further. The temperatures are given in degrees centigrade and, where not otherwise stated, parts and percentages are given by weight.

EXAMPLE 1

1st step 900 parts by volume of styrene are added dropwise while stirring to 745 parts of ethylene imine and 9 parts of metallic sodium; 100 parts by volume thereof are added dropwise quickly whilst the remaining 800 parts by volume are so dropped in that the temperature of the reaction mixture is 40–50°. On completion of the dropwise addition, the mixture is stirred overnight at room temperature. The unreacted sodium is removed by mechanical means and the excess ethylene imine is distilled off under reduced pressure. The residue is fractionated in vacuo. The 1-phenyl-2-(N-aziridinyl)-ethane so obtained boils at 48°/0.1 torr; $n_D^{20}=1.5205$. (Yield rate 90% calculated on styrene.)

2nd step 500 parts by volume of methanol are stirred and, in an ice bath, saturated with hydrogen chloride. 100 parts of 1-phenyl-2-(N-aziridinyl)-ethane dissolved in 100 parts by volume of methanol are added dropwise at a temperature of 10–15°. The solution is then concentrated to dryness and the residue is dried in a drying chamber. The N(2-chloroethyl)-phenylethylammonium chloride formed melts, when recrystallised from ethanol/glacial acetic acid, at 188–190°. (Yield rate 99%.)

Analysis.—Calculated (percent): C, 54.55; H, 6.87; N, 7.37; Cl, 32.31. Found (percent): C, 54.56; H, 6.78; N, ——; Cl, 32.33.

3rd step 389 parts of N(2-chloroethyl)-phenylethylammonium chloride are finely pulverised, mixed with 470 parts of aluminum chloride and the mixture is slowly heated in an oil bath to 180° (bath temperature) and kept at this temperature for 12 hours. After cooling to about 100°, the melt is poured onto ice. 2500 parts by volume of an aqueous 30%-sodium hydroxide solution are added to this stirred solution and, after the precipitate has dissolved, it is extracted with ether. The ethereal solution is dried over magnesium sulphate/potassium carbonate, the drying agent is filtered off and the ether is evaporated. The residue is fractionated in vacuo. The 1,2,4,5-tetrahydro-3-benzazepine obtained boils at 65°/0.1 torr (M.P. 10°); $n_D^{20}=1.565$. (Yield rate 73% calculated on styrene.)

The hydrochloride melts at 248–250°.

Analysis.—Calculated (percent): C, 81.58; H, 8.90; N, 9.52. Found (percent): C, 81.27; H, 8.83; N, 9.45.

EXAMPLE 2

(a) 900 parts by volume of styrene are added dropwise while stirring to 1000 parts of propylene imine and 9 parts of metallic sodium; 100 parts by volume thereof are added dropwise quickly whilst the remaining 800 parts by volume are so dropped in that the temperature of the reaction mixture is 40–45°. On completion of the dropwise addition, the mixture is stirred overnight at room temperature. The unreacted sodium is removed by mechanical means and the excess propylene imine is distilled off under reduced pressure. The residue is fractionated in vacuo. The 1-phenyl-2-(N-2'-methyl-aziridinyl)-ethane so obtained boils at 60°/0.1 torr; $n_D^{20}=1.5066$. (Yield rate 52% calculated on styrene.)

(b) 500 parts by volume of methanol are stirred and, in an ice bath, saturated with hydrogen chloride. 100 parts of 1-phenyl-2-(N-2'-methyl-aziridinyl)-ethane dissolved in 100 parts by volume of methanol are added dropwise at a temperature of 10–15°. The solution is then concentrated to dryness and the residue is dried in a drying chamber. The N-(1'-methyl-2'-chloroethyl)-N-phenethyl-ammonium chloride formed melts, when recrystallised from ethanol, at 160–165°. (Yield rate 99%.)

EXAMPLE 3

281 parts of 1-phenyl-1-methyl-2-(1'-aziridinyl)-ethane, (produced according to Example 2 from α-methyl styrene and ethylene imine) are added to 800 parts by volume of ethyl alcohol which has been saturated with hydrogen chloride. The temperature of the reaction mixture rises to 30° and a crystalline precipitate is formed. The precipitation is completed by the addition of diethyl ether. The precipitate is filtered off and washed several times with ether. The N - (2-chloro-ethyl)-N-(β-methylphenethyl)-ammonium chloride formed melts at 178–180°. (Yield rate 75% calculated on α-methyl styrene.)

234 parts of the latter chloride are heated for 15 hours at 170° with 200 parts of aluminium chloride. While still hot, the reaction mixture is poured onto ice and the mixture is made alkaline with 2000 parts by volume of 30% aqueous sodium hydroxide solution. A brown oil separates. The alkaline solution is extracted several times with ether. The combined ether extracts are dried over potassium carbonate/magnesium sulphate, the ether is distilled off and the oily residue is fractionated. The 5-methyl-1,2,4,5-tetrahydro - 3 - benzazepine so obtained boils at 72° under 0.6 torr ($n_D^{20}=1.5580$). (Yield rate 69% calculated on α-methyl styrene.)

EXAMPLE 4

14 g. of polyphosphoric acid are heated to 150° and 1 g. of N-(β-chloro-β-phenylethyl)-N-phenylethyl-ammonium chloride is added in portions. On completion of the addition, the whole is kept for half an hour at 150°. The clear solution is poured onto 15 g. of ice whereupon a precipitate is formed. The mixture is made alkaline with 30% NaOH while cooling and the oil which separates is taken up in methylene chloride. After distilling off the methylene chloride, the 1-phenyl-2,3,4,5-tetrahydro-1H-3-benzazepine is distilled under high vacuum at 140–150°. (Yield rate about 75% calculated on the starting phenylethylammonium chloride.)

The phenylethylammonium chlorides listed in the first column of the following table are obtained in the manner described in Examples 1 and 2 from corresponding 1-aryl-2-(1'-aziridinyl)-ethanes and ethanolic hydrochloride. These are then reacted with aluminium chloride and then with alkali to form the 1,2,4,5-tetrahydro-3-benzazepines given in the 3rd column.

As herbicides can be mentioned, for instance, halogendiamino-, alkoxy-diamino- and alkylthio-diamino-s-triazines, in particular, 2-chloro-4-methylamino-6-isopropylamino-s-triazine,
2-chloro-4,6-diethylamino-s-triazine,
2-chloro-4-ethylamino-6-isopropylamino-s-triazine,
2-chloro-4,6-diisopropylamino-s-triazine,
2-chloro-4-ethylamino-6-diethylamino-s-triazine,
2-chloro-4,6-bis-diethylamino-s-triazine,
2-chloro-4-diethylamino-6-isopropylamino-s-triazine,
2-chloro-4-ethylamino-6-(3'-methoxy-propylamino)-s-triazine,
2-methoxy- and 2-methylthio-4,6-diethylamino-s-triazine,
2-methoxy- and 2-methylthio-4-ethylamino-6-isopropylamino-s-triazine,
2-methoxy- and 2-methylthio-4,6-diisopropylamino-s-triazine,
2-methylthio-4-isopropylamino-6-(3'-methoxy-propylamino)-s-triazine,
2-methoxy-4,6-bis-(3'-methoxypropylamino)-s-triazine, and
2-methylthio-4,6-bis-(3'-methoxypropylamino)-s-triazine.

| Phenylethylamine hydrochloride | M.P., degrees | 1,2,4,5-tetrahydro-3-benzazepine | Physical data |
| --- | --- | --- | --- |
| N(2'-chloroethyl)-4-chlorophenylethylammonium chloride. | 189–191 | 7-chloro-1,2,4,5-tetrahydro-3-benzazepine hydrochloride. | B.P. 100–120°; 0.1 torr; M.P. 171–173°. |
| N(1'-methyl-2'-chloroethyl)-phenylethylammonium chloride. | 160–165 | 2-methyl-1,2,4,5-tetrahydro-3-benzazepine | B.P. 60°; 0.2 torr. |
| N(β-chloro-β-phenylethyl)-phenylethylammonium chloride. | 168–170 | 1-phenyl-1,2,4,5-tetrahydro-3-benzazepine | Cannot be distilled; $n_D^{20}=1.4670$. |
| N(2-chlorocyclohexyl)-phenylethylammonium chloride. | 165–167 | 1,2,3,4,4a,6,7,11b-octahydro-5H-dibenz[d,b]azepine. | Cannot be distilled. |
| N(2'-chloroethyl)-α-methylphenylethylammonium chloride. | 149–151 | 4-methyl-1,2,4,5-tetrahydro-3-benzazepine | B.P. 64°; 0.2 torr. |
| N(2'-chloroethyl)-β-methyl-4-isopropylphenylethylammonium chloride. | 184–186 | 5-methyl-8-isopropyl-1,2,4,5-tetrahydro-3-benzazepine. | B.P. 71–72; 0.2 torr; $n_D^{20}=1.5554$. |

For instance, the phenethylammonium chlorides listed below are obtained in the manner described in Examples 2 and 3 from corresponding 1-aryl-2-(1'-aziridinyl)-ethanes and ethanolic hydrogen chloride.

(1) N-(2'-chloroethyl)-N-(4-chlorophenethyl)-ammonium chloride, M.P. 189–191° C.,
(2) N-(2'-chloroethyl)-N-(β-methyl-4-isopropylphenyl)-ammonium chloride, M.P. 184–186° C.,
(3) N-(2'-chloroethyl)-N-(β - methyl-phenethyl)-ammonium chloride, M.P. 178–180° C.,
(4) N-(2'-chlorocyclohexyl)-phenethylammonium chloride, M.P. 165–167° C.,
(5) N-(2'-chloro-2'-phenylethyl) - N - phenethylammonium chloride, M.P. 168–170° C.

The production of herbicidal compositions occurs by methods known per se by intimately mixing and milling the active substances of Formula IIIA with suitable carriers and/or distributing agents.

The herbicidal compositions according to the invention are produced in the known way by intimately mixing and milling active substances of Formula IIIA with suitable carriers, optionally with the addition of dispersing agents or solvents which are inert to the active substances. The active substances can be present and used in dusts, sprinkling agents, granulates, coated granules, impregnated granules, homogeneous granules; wettable powders, pastes, emulsions; solutions and aerosols.

The concentration of active substance in these compositions is, e.g. 0.01 to 80%.

Other biocidal active substances or agents can be admixed with the compositions according to the invention. Thus, the new compositions, in addition to the compounds mentioned of Formula IIIA can contain, e.g. insecticides, other herbicides, fungicides, bactericides, fungistatica, bacteriostatica or nematocides, to widen the range of action.

The compositions according to the invention can also contain synthetic fertilisers and trace elements.

The following examples serve to illustrate the application part of the present invention; where not otherwise stated, parts mean parts by weight.

Wettable powder

The following components are used to produce a 50% wettable powder:

50 parts of N-(1'-methyl-2'-chloroethyl)-N-phenethylammonium chloride
5 parts of a dibutylphenyl/ethylene oxide condensate,
5 parts of a naphthalene sulphonic acid/phenol sulphonic acid/formaldehyde condensation product,
40 parts of Champagne chalk.

The active substances mentioned are drawn onto the carriers and then mixed and milled with the additives given. Wettable powders having excellent wettability and suspendability are obtained. Suspensions of any concentration desired can be obtained from such wettable powders by dilution with water.

Granulate 90 parts of a granular carrier, e.g. sand, kaolin, montmorillonite, are moistened with 1.5 parts of water, isopropanol or polyethylene glycol and mixed with 10 parts of N - (2 - chloro-ethyl)-N-(β-methyl-phenethyl)-ammonium chloride.

These compositions are applied preferably in such amounts that at least about 0.5 kg., but not more than 5 kg. of active ingredient are applied per hectare of area in which the growth of weeds and undesirable grasses is to be controlled.

We claim:

1. A process for the production of a 1,2,4,5-tetrahydro-3-benzazepine, comprising (a) reacting an aziridine derivative of the formula:

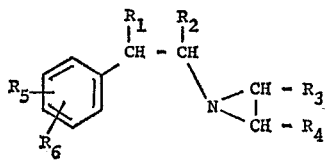

with a hydrogen halide in a solvent selected from the group consisting of water, alkanols having up to 4 carbon atoms, diethyl ether, methylethyl ketone, acetone, and mixtures thereof, (b) heating the resulting phenethylammonium halide of the formula:

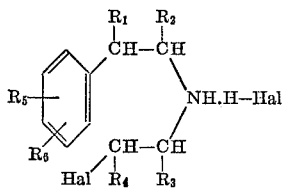

and a Lewis acid at a temperature of from about 100° C. to 300° C., and (c) recovering the resulting 1,2,4,5,-tetrahydro-3-azepine of the formula:

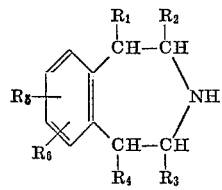

in which formula
each of $R_1$, $R_2$, $R_3$ and $R_4$ represents hydrogen, alkyl of from 1 to 6 carbon atoms; one or two of $R_1$, $R_2$, $R_3$ and $R_4$ may also represent cycloalkyl of from 3 to 7 ring carbon atoms, unsubstituted phenyl, or phenyl substituted by a member selected from the group consisting of halogen of an atomic number of at most 35 and lower alkyl, or $R_3$ and $R_4$ taken together represents trimethylene or tetramethylene, each of $R_5$ and $R_6$ represents hydrogen, halogen of an atomic number of at most 35, lower alkyl or trifluoromethyl, and Hal represents halogen of an atomic number of at least 17.

2. A process as described in claim 1, wherein said Lewis acid is aluminum trichloride.

3. A process as described in claim 1, wherein said Lewis acid is polyphosphoric acid.

References Cited
UNITED STATES PATENTS
3,393,192  7/1968  Walters et al. _____ 260—239
3,442,890  5/1969  Larsen et al. _____ 260—239

OTHER REFERENCES
Elderfield, Heterocyclic Compounds, vol. 9, (John Wiley & Sons, Inc., New York, 1967), pp. 246–248.

Wagner et al., Synthetic Organic Chemistry, (New York, 1953), pp. 2–3 and 317–323.

Weissberger, editor, Chemistry of Heterocyclic Compounds, vol. 19, Part One, (Interscience, New York, 1964), p. 551.

ALTON D. ROLLINS, Primary Examiner

U.S. Cl. X.R.

71—93, 121; 260—239 E, 570.5 R, 570.5 CA, 570.8 R; 424—244